(12) United States Patent
Ozawa et al.

(10) Patent No.: US 7,075,561 B2
(45) Date of Patent: Jul. 11, 2006

(54) IMAGE PRINTING APPARATUS AND COLOR MISREGISTRATION CORRECTION METHOD

(75) Inventors: Ken-ichi Ozawa, Tokyo (JP); Tomoo Kudou, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 307 days.

(21) Appl. No.: 10/783,373

(22) Filed: Feb. 20, 2004

(65) Prior Publication Data

US 2004/0239746 A1 Dec. 2, 2004

(30) Foreign Application Priority Data

May 29, 2003 (JP) .............................. 2003-152003

(51) Int. Cl.
*G03G 15/01* (2006.01)

(52) U.S. Cl. ...................................... 347/116; 399/301

(58) Field of Classification Search .................... None
See application file for complete search history.

(56) References Cited

U.S. PATENT DOCUMENTS 5,550,625 A * 8/1996 Takamatsu et al. ......... 399/301

6,218,660 B1 * 4/2001 Hada .......................... 250/226
6,327,453 B1 * 12/2001 Imaizumi et al. ........... 399/301
6,791,590 B1 * 9/2004 Misaizu et al. ............. 347/115

\* cited by examiner

*Primary Examiner*—Huan Tran
(74) *Attorney, Agent, or Firm*—Frishauf, Holtz, Goodman & Chick, P.C.

(57) ABSTRACT

This invention is directed to an image printing apparatus which prints a color image by superimposing a plurality of images of different colors and a color misregistration correction method for the apparatus. In order to shorten the time required for color misregistration correcting operation, the image printing apparatus of this invention includes a controller which controls color misregistration correcting devices. The controller repeatedly prints color registration marks on an intermediate transfer belt, derives a positional offset correction amount for images of the respective colors on the basis of the positional relationship between the registration marks detected by registration sensors, and corrects the printing position of an image of each color on the basis of the positional offset correction amount. In this case, while the derived positional offset correction amount has not reached a predetermined target range, positional offset correction is performed on a pixel basis. When the positional offset correction amount has reached the target range, positional offset correction including a correction amount less than the pixel unit is executed.

13 Claims, 7 Drawing Sheets

IMAGE PRINTING APPARATUS AND COLOR MISREGISTRATION CORRECTION METHOD

BACKGROUND OF THE INVENTION

1. Field of the Invention

The present invention relates to an image printing apparatus which prints a color image by superimposing a plurality of images of various colors and a color misregistration correction method in the apparatus.

2. Description of the Prior Art

There have been available image printing apparatuses such as color copying machines and color printers which print and output color images by superimposing yellow (Y), magenta (M), cyan (C), and black (K) images.

For example, in a tandem color copying machine using an electrophotographic process, image printing units, each including a photosensitive drum, charging device, scanning optical device, developing device, and the like, are prepared for the respective colors and arranged along an intermediate transfer belt in the form of an endless belt. This copying machine is designed to print a color image by superimposing images of the respective colors on the rotating intermediate transfer belt. The color image printed on the intermediate transfer belt is transferred onto a transfer sheet and output.

When a color image is to be printed by superimposing images of the respective colors in this manner, color misregistration occurs to result in a failure to obtain a beautiful image unless the printing positions of the images of the respectively color accurately match. Therefore, test images for color misregistration correction called registration marks are printed on the intermediate transfer belt. These marks are read by optical sensors to obtain necessary correction amounts, and the printing positions of images are corrected.

The correction amount obtained by printing and measuring registration marks includes a small correction amount less than the pixel unit. Of such corrections, correction on a pixel basis in the main scanning direction is realized by adjusting the timing of supplying an image signal to the laser diode of each scanning optical device on a clock basis. Correction with an amount less than the pixel unit in the main scanning direction is performed by, for example, surface phase control on each polygon mirror which scans a laser beam on a photosensitive body in the direction of width.

In color misregistration correction, a necessary correction amount is derived by printing and measuring registration marks, and both correction on a pixel basis and correction with an amount less than the pixel unit are executed in accordance with the correction amount. This process is repeated until the color misregistration amount is made to fall within an allowable range.

Correction on a pixel basis is finished in a short period of time because it can be done by only adjusting the timing of supplying an image signal to each laser diode on a clock basis. On the other hand, in surface phase control on each polygon mirror which is performed to make correction with an amount less than the pixel unit, a long period of time (several seconds) is required between the instant at which phase adjustment is made and the instant at which the rotation of each polygon mirror stabilizes. Conventionally, both correction with an amount less than the pixel unit, which requires a long period of time, and correction on a pixel basis, which can be finished within a short period of time, are executed for every correction based on the printing/measurement of registration marks. As a consequence, the cycle between the time given registration marks are printed and the time the next registration marks are printed is prolonged. It therefore takes a long time to complete a series of correcting operations.

SUMMARY OF THE INVENTION

The present invention has been made in consideration of the above problems in the prior art, and has its object to shorten the time required for color misregistration correcting operation in an image printing apparatus which prints a color image by superimposing images of different colors.

In order to achieve the above object, according to the first aspect of the present invention, there is provided an image printing apparatus which includes a plurality of image printing units for printing images of different colors and prints a color image by superimposing, on a single image printing medium, a plurality of images of the respective colors printed by the plurality of image printing units, comprising a test image printing unit which prints, on the image printing medium, test images for correcting a positional offset between images of the respective colors, a correction amount deriving unit which derives a positional offset correction amount for the images of the respective colors by measuring the test images printed on the image printing medium, a correction unit which corrects a printing position of an image printed by the each image printing unit, and a control unit which controls a series of correcting operations for correcting a positional offset between the images of the respective colors, wherein the control unit executes the correcting operation in a first stage and a second stage., corrects a positional offset on a pixel basis in the first state until the positional offset correction amount reaches a predetermined target range, and corrects a positional offset including a correction amount less than a pixel unit in the second stage.

According to the first embodiment, the operation of correcting the positional offset of an image of each color is executed in the first stage, in which a positional offset is corrected on a pixel basis, and the second stage, in which a positional offset executed, including a correction amount less than the pixel unit. When a positional offset amount is made to fall within a target range by repeating a series of steps of printing/measuring test images, deriving a necessary correction amount, and executing correction, there is no need to make fine adjustment like correction with an amount less than the pixel unit in the process of convergence, and the object can be achieved by only executing detailed adjustment in the final finishing step. Therefore, by performing correction including correction with an amount less than the pixel unit in two stages, the positional offset of an image of each color can be efficiently performed in a short period of time. Note that in the second stage, it suffices to execute both correction on a pixel basis and correction with an amount less than the pixel unit.

According to the second aspect of the present invention, there is provided an image printing apparatus wherein the control unit described in the first aspect derives a correction amount by executing printing and measurement of the test images in the first stage, and performs a correction in the second stage on the basis of a correction amount left unprocessed in the first stage.

According to the second aspect described above, in the second stage, a correction amount left unprocessed in the first state is used without deriving any correction amount by printing/measuring new test images, and hence the time required to complete the correcting operation can be shortened. Note that when the positional offset correction amount finally obtained in the first stage falls within the target range, it suffices to concurrently execute both correction on a pixel basis and correction with an amount less than the pixel unit in the second stage without performing correction on a pixel basis in the first stage.

According to the third aspect of the present invention, in the image printing apparatus described in the first or second aspect, a time required for correction on a pixel basis is shorter than a time required for correction with an amount less than a pixel unit.

According to the third aspect described above, when correction on a pixel basis is repeatedly performed together with printing and measurement of test images until a positional offset correction amount reaches a predetermined target range, since the time required for correction on a pixel basis is short, operation up to the completion of correction can be performed in a short period of time.

According to the fourth aspect of the present invention, in the image printing apparatus described in one of the first to third aspects, correction with an amount less than the pixel unit is performed by surface phase control on polygon mirrors.

According to the fourth aspect, correction with an amount less than the pixel unit can be finely performed.

According to the fifth aspect of the present invention, there is provided an image printing apparatus which includes a plurality of image printing units for printing images of different colors and prints a color image by superimposing, on a single image printing medium, a plurality of images of the respective colors printed by the plurality of image printing units, comprising a test image printing unit which prints, on the image printing medium, test images for correcting a positional offset between images of the respective colors, a correction amount deriving unit which derives a positional offset correction amount for the images of the respective colors by measuring the test images printed on the image printing medium, a correction unit which corrects a printing position of an image printed by each image printing unit, and a, control unit which controls a series of correcting operations for correcting a positional offset between the images of the respective colors, wherein after deriving a positional offset correction amount by printing and measuring test images, the control unit repeatedly executes correction of a printing position of an image on the basis of the positional offset correction amount, corrects a positional offset of an image on a pixel basis while the derived positional offset correction amount has not reached a predetermined target range, and corrects a printing position of an image including a correction amount less than a pixel unit when the positional offset correction amount has reached the target range.

According to the fifth aspect described above, while a derived positional offset correction amount has not reached a predetermined target range, positional offset correction for an image of each color is repeatedly performed on a pixel basis. When the positional offset correction amount reaches the target range, correction including a correction amount less than the pixel unit is performed. In the conversion process in which a positional offset correction amount reaches the target range, correction is executed on a pixel basis. Therefore, positional offset correction for an image of each color can be efficiently performed in a short period of time.

According to the sixth aspect of the present invention, there is provided an image printing apparatus, while the positional offset correction amount has not reached the target range, the control unit described in the fifth aspect corrects the positional offset of the image on a pixel basis by repeatedly printing the test images, measuring the test images, deriving the positional offset correction amount, and correcting a printing position of an image.

According to the sixth aspect described above, in the conversion process in which a positional offset correction amount reaches the target range, positional offset correction for an image of each color is executed on a pixel basis. Therefore, positional offset correction for an image of each color can be efficiently performed in a short period of time.

According to the seventh aspect of the present invention, there is provided an image printing apparatus, the control unit described in the fifth or sixth aspect finishes a series of correcting operations by executing correction including a correction amount less than the pixel unit.

According to the seventh aspect described above, after a positional offset correction amount reaches a predetermined target range, no test image is printed and measured, and correction including an amount less than the pixel unit is executed to finish a series of correcting operations. In this manner, while a test image is repeatedly printed and measured, only correction on a pixel basis is executed, and correction including an amount less than the pixel unit is executed only once at the end of correcting operation. This makes it possible to efficiently perform positional offset correction for an image of each color in a short period of time.

According to the eighth aspect, in the image printing apparatus described in one of the fifth to seventh aspects described above, the time required for correction on a pixel basis is shorter than a time required for correction with an amount less than a pixel unit.

According to the eighth aspect described above, the same effect as that in the third aspect can be obtained.

According to the ninth aspect of the present invention, in the image printing apparatus described in any one of the fifth to eighth aspects, correction with an amount less than the pixel unit is performed by surface phase control on polygon mirrors.

According to the ninth aspect, the same effect as that in the fourth embodiment can be obtained.

According to the 10th aspect of the present invention, there is provided a color misregistration correction method in an image printing apparatus which includes a plurality of image printing units for printing images of different colors and prints a color image by superimposing, on a single image printing medium, a plurality of images of the respective colors printed by the plurality of image printing units, comprising executing a color misregistration correction in a first stage and a second stage after the first stage, correcting a positional offset on a pixel basis in the first stage until a positional offset correction amount for images of the respective colors reaches a predetermined target range, and correcting a positional offset including a positional offset correction amount less than a pixel unit in the second stage.

According to the 10th aspect described above, positional offset correction for an image of each color is executed in the first stage, in which a positional offset is corrected on a pixel basis, and the second state, in which a positional offset is corrected including a correction amount less than the pixel unit. Since fine adjustment including a correction amount less than the pixel unit is performed only when a necessary positional offset correction amount reaches the target range, the positional offset of an image of each color can be efficiently corrected in a short period of time.

According to the 11th aspect of the present invention, there is provided a color misregistration correction method in an image printing apparatus which includes a plurality of image printing units for printing images of different colors and prints a color image by superimposing, on a single image printing medium, a plurality of images of the respective colors printed by the plurality of image printing units, comprising the steps of (a) printing, on the image printing medium, test images for correcting a positional offset between images of the respective colors, (b) deriving a positional offset correction amount for the images of the respective colors by measuring the test images, (c) correcting a positional offset between the images of the respective colors on the basis of the positional offset correction amount, (d) repeating the steps (a) to (c) until the positional offset correction amount reaches a predetermined target range, and correcting the positional offset between the images of the respective colors including a positional offset with an amount less than a pixel unit when the positional offset correction amount reaches the target range.

According to the 11th aspect described above, while a derived positional offset correction amount has not reached a predetermined target range, positional offset correction for an image of each color, including printing and measurement of a test image, is repeatedly performed on a pixel basis. When the positional offset correction amount reaches the target range, correction including a correction amount less than the pixel unit is performed. In the conversion process in which a positional offset correction amount reaches the predetermined target range, correction is executed on a pixel basis. Therefore, positional offset correction for an image of each color can be efficiently completed in a short period of time.

According to the 12th aspect of the present invention, in the color misregistration correction method described in the 10th or 11th aspect, a time required for correction on a pixel basis is shorter than a time required for correction with an amount less than a pixel unit.

According to the 12th aspect described above, the same effect as in the third aspect can be obtained.

According to the 13th aspect of the present invention, in the color misregistration correction method described in one of the 10th aspect to the 12th aspect, correction with an amount less than the pixel unit is performed by surface phase control on polygon mirrors.

According to the 13th aspect described above, the same effect as that in the fourth aspect can be obtained.

As is obvious from the above aspects, according to the image printing apparatus and the color misregistration correction method for the apparatus according to the present invention, a positional offset is corrected on a pixel basis until a positional offset correction amount for an image of each color reaches a predetermined target range. When the correction amount reaches the target range, a positional offset is corrected including a correction amount less than the pixel unit. Therefore, the positional offset of an image of each color can be efficiently corrected in a short period of time, thus greatly shortening the wait time of the user.

The above and many other objects, features and advantages of the present invention will become manifest to those skilled in the art upon making reference to the following detailed description and accompanying drawings in which a preferred embodiment incorporating the principle of the present invention is shown by way of illustrative examples.

DETAILED DESCRIPTION OF THE PREFERRED EMBODIMENT

A preferred embodiment of the present invention will be described below with reference to the accompanying drawings.

Figure 2:
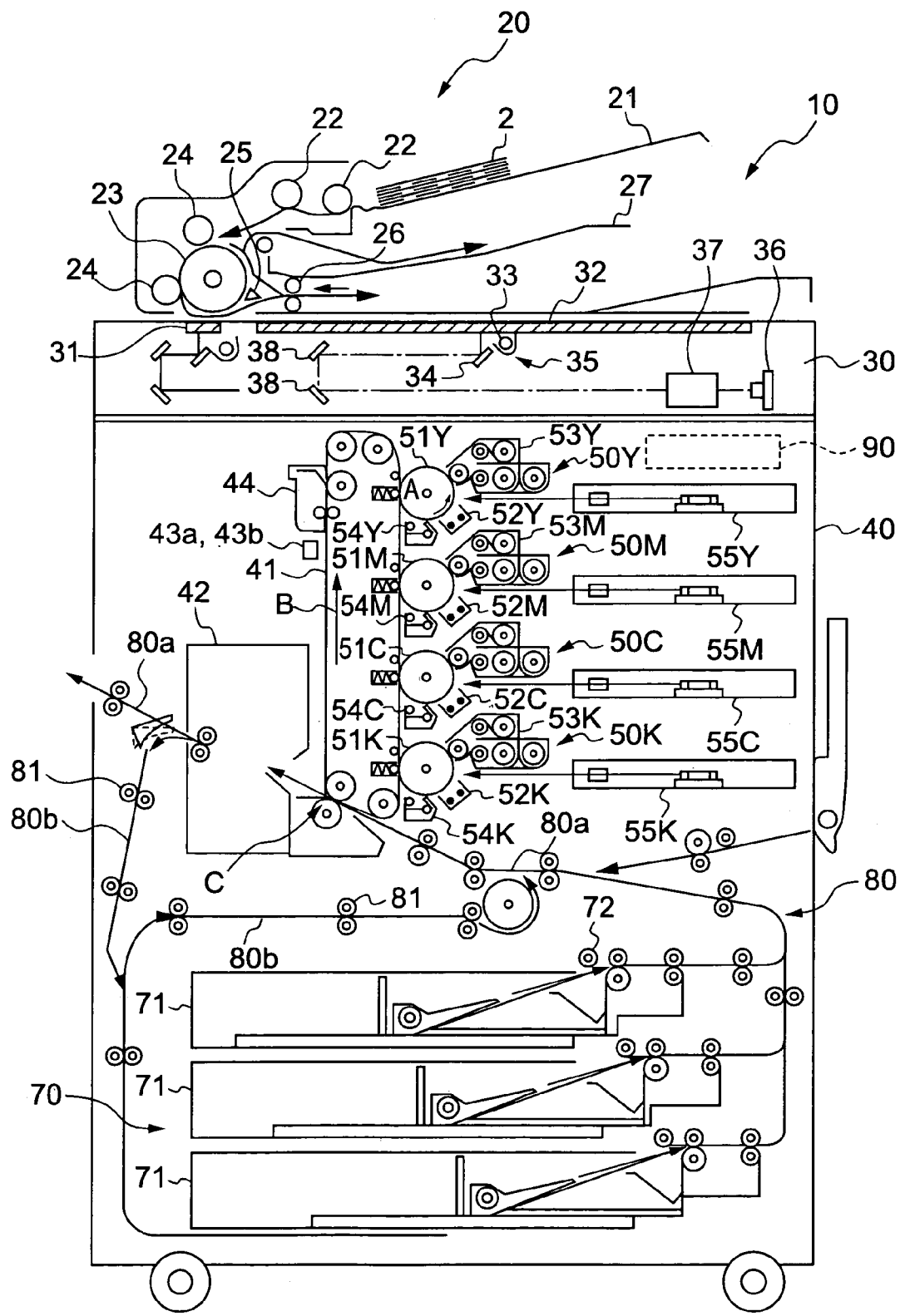
FIG. 2 is a view for explaining the schematic arrangement of an image printing apparatus according to an embodiment of the present invention.

FIG. 2 shows the schematic arrangement of an image printing apparatus 10 according to an embodiment of the present invention. The image printing apparatus 10 is a so-called color digital copying machine. The image printing apparatus 10 is comprised of an automatic document feeder 20, reading unit 30, and printer unit 40. The automatic document feeder 20 has a function of feeding originals 2 stacked on an original tray 21 to the reading portion of the reading unit 30 one by one and delivering the read originals onto a delivery tray 27. The automatic document feeder 20 also has a function of inverting the obverse and reverse surfaces of a double-sided original after reading of one surface, and feeding the original to the reading unit 30 again.

The automatic document feeder 20 includes paper feed rollers 22 which sequentially feed originals stacked on the original tray 21 from the uppermost original, a contact roller 23 which makes an original pass a contact glass 31 serving as an original reading portion while brining the original into contact with the contact glass 31, and guide rollers 24 which guide the original fed by the paper feed rollers 22 along the contact roller 23. The automatic document feeder 20 also includes a pawl 25 which switches the traveling direction of the original which has passed the contact glass 31, inversion rollers 26 which invert the obverse and reverse surfaces of a double-sided original, and the delivery tray 27 on which an original having undergone reading operation is delivered.

The reading unit 30 has a function of reaching an original in color. The reading unit 30 includes an exposure scanning unit 35 constituted by a light source 33 and mirror 34, a color line image sensor 36 which receives reflected light from an original and outputs en electrical signal corresponding the intensity of the received light for each color, a condenser lens 37 which condenses reflected light from the original onto the line image sensor 36, and various kinds, of mirrors 38 which form an optical path for guiding the reflected light from the mirror 34 of the exposure scanning unit 35 to the line image sensor 36.

When the original fed by the automatic document feeder 20 is to be read, the exposure scanning unit 35 moves to the reading portion below the contact glass 31 and stops at it to read the original which is conveyed by the contact roller 23 and moves on the contact glass 31. When the original placed on a platen glass 32 is to be read, the exposure scanning unit 35 moves from the left to the right of the platen glass 32 along its lower surface to read the original in a stationary state.

The printer unit 40 is a so-called tandem color image printing apparatus, which includes an intermediate transfer belt 41 in the form of an endless belt, a plurality of image printing units 50Y, 50M, 50C, and 50K each of which prints a monochrome image on the intermediate transfer belt 41, a paper feed unit 70 which feeds a transfer sheet, a convey unit 80 which conveys the fed transfer sheet, and a fixing device 42. The printer unit 40 also has a control circuit 90 which controls the overall operation of the image printing apparatus.

The image printing units 50Y, 50M, 50C, and 50K respectively print yellow (Y), magenta (M), cyan (C), and black (K) images on the intermediate transfer belt 41.

The image printing unit 50Y includes a photosensitive body 51Y serving as a cylindrical electrostatic latent image carrier (transfer drum) on which an electrostatic latent image is printed, and a charging device 52Y, developing device 53Y, and cleaning device 54Y which are arranged around the photosensitive body 51Y. The image printing unit 50Y also includes a laser unit 55Y constituted by a laser diode, a polygon mirror, and various kinds of lenses and mirrors.

Figure 3:
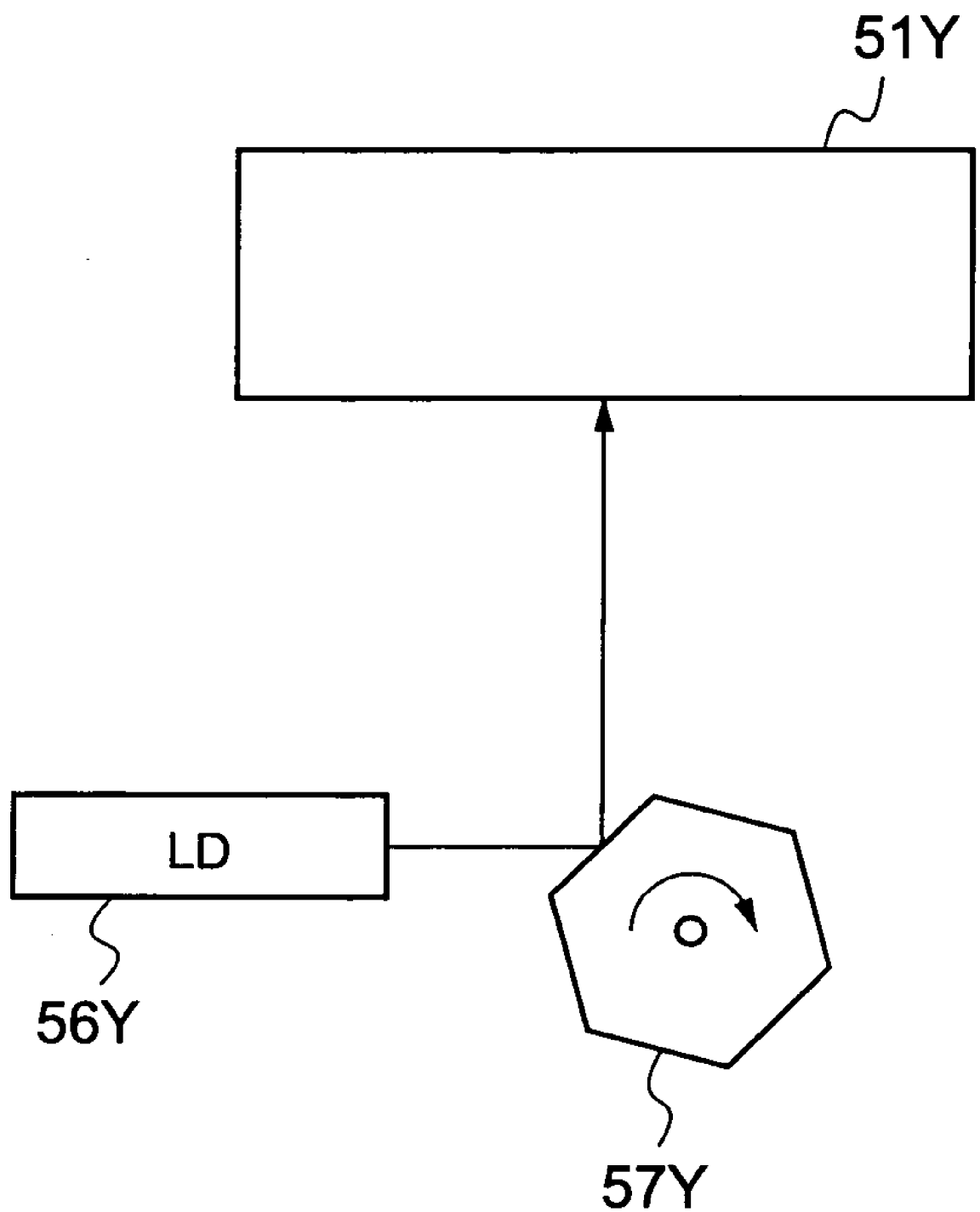
FIG. 3 is a view for explaining how a laser beam is reflected by a polygon mirror and scanned on a photosensitive body.

The photosensitive body 51Y is driven by a driving unit (not shown) to rotate in a predetermined direction (the direction indicated by an arrow A in FIG. 2). The charging device 52Y uniformly charges the photosensitive body 51Y. As shown in FIG. 3, the laser unit 55Y has a function of making a rotating polygon mirror 57Y reflect a laser beam emitted from a laser diode 56Y, thereby repeatedly scanning the surface of the photosensitive body 51Y with the laser beam in the direction of width (main scanning direction). An electrostatic latent image is printed on the photosensitive body 51Y by scanning the uniformly charged surface of the photosensitive body 51Y with a laser beam which is turned on/off in accordance with yellow image data. The developing device 53Y develops the electrostatic latent image on the photosensitive body 51Y with yellow toner. The toner image printed on the surface of the photosensitive body 51Y is transferred onto the intermediate transfer belt 41 at a position where the photosensitive body 51Y comes into contact with the intermediate transfer belt 41. The cleaning device 54Y has a function of scraping and removing the residual toner on the surface of the photosensitive body 51Y with a blade or the like after transfer, and recovering it.

Each of the image printing units 50M, 50C, and 50K has the same arrangement as that of the image printing unit 50Y except that the colors of toners differ from that used in the image printing unit 50Y, and laser beams are turned on/off in accordance with image data corresponding to the respective colors. Therefore, a description of each image printing unit will be omitted. Note that the same reference numerals as those used for the image printing unit 50Y denote the same constituent elements used for the image printing units 50M, 50C, and 50K, with the suffix "Y" being replaced with "M", "C", and "K".

The intermediate transfer belt 41 is pivotally supported by being wound around a plurality of rollers. The intermediate transfer belt 41 is rotated by a driving unit (not shown) in the direction indicated by an arrow B. In the process of rotation, (Y), (M), (C), and (K) images are sequentially superimposed/printed on the intermediate transfer belt 41 by the image printing units 50Y, 50M, 50C, and 50K, thereby synthesizing a color image. This color image is transferred to a transfer sheet from the intermediate transfer belt 41 at a secondary transfer portion C provided on the lower end portion of the rotation path of the intermediate transfer belt 41.

A pair of registration sensors 43a and 43b formed from reflection type optical sensors which detect images formed on the intermediate transfer belt 41 are arranged downstream of the secondary transfer portion C in the rotating direction. The two registration sensors 43a and 43b are spaced apart from each other in the direction of width of the intermediate transfer belt 41. A cleaning device 44 for removing the residual toner on the intermediate transfer belt 41 after transfer is placed downstream of the registration sensors 43a and 43b.

The paper feed unit 70 has a plurality of paper feed cassettes 71, in which transfer sheets of different sizes and types are generally stored. The transfer sheets stored in each paper feed cassette 71 are fed toward the convey unit 80 by a first paper feed roller 72 one by one from the uppermost sheet. The convey unit 80 is constituted by a normal path 80a through which a transfer sheet from the paper feed cassette 71 is caused to pass through the secondary transfer portion C and fixing device 42 to be delivered onto a delivery tray outside the machine, and an inversion path 80b through which the transfer sheet having passed through the fixing device 42 is inverted and made to merge with the normal path 80a again at a position upstream of the secondary transfer portion C. Each of the paths 80a and 80b has many convey rollers 81 arranged at intervals smaller than the size of a minimum size transfer sheet in the feed direction.

The image printing apparatus 10 has a function of executing the correcting operation of performing adjustment to prevent color misregistration of a color image printed on the intermediate transfer belt 41.

Figure 4:
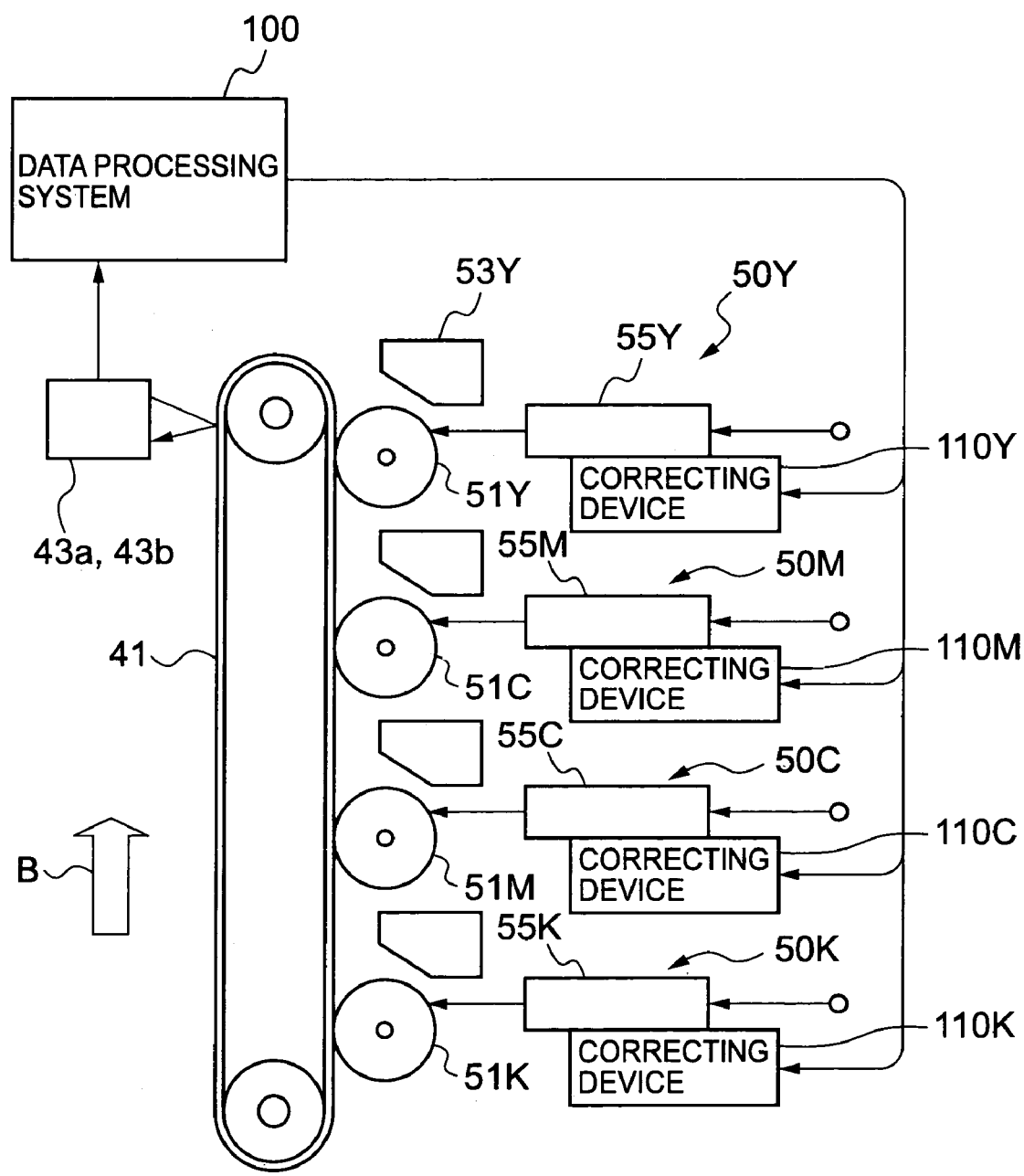
FIG. 4 is a view for explaining the schematic arrangement of a portion associated with color misregistration correction in the image printing apparatus of the present invention.

FIG. 4 shows the schematic arrangement of a portion associated with correcting operation. In color misregistration correction, test images for color misregistration called registration marks are printed on the intermediate transfer belt 41. These marks are read by the registration sensors 43a and 43b to obtain a correction amount. The printing positions of images of the respective colors are then corrected.

A data processing system 100 is included in the control circuit 90, and has a function of printing registration marks on the intermediate transfer belt 41 by controlling the image printing units 50Y, 50M, 50C, and 50K, a function of computing/deriving a correction amount by detecting the positions of registration marks by using the registration sensors 43a and 43b, and a function of controlling the overall flow of correcting operation. Each of correcting devices 110Y, 110M, 110C, and 110K has a function of adjusting a printing position when a corresponding one of the image printing units 50Y, 50M, 50C, and 50K prints an image on the intermediate transfer belt 41. Each of the correcting devices 110Y, 110M, 110C, and 110K has a function of adjusting the start position of each line on a clock basis (i.e., on a pixel basis) in ON/OFF control on a laser beam in accordance with image data, and a function of adjusting the start position of each line at a level less than the pixel unit by surface phase control on the polygon mirror.

Figure 1:
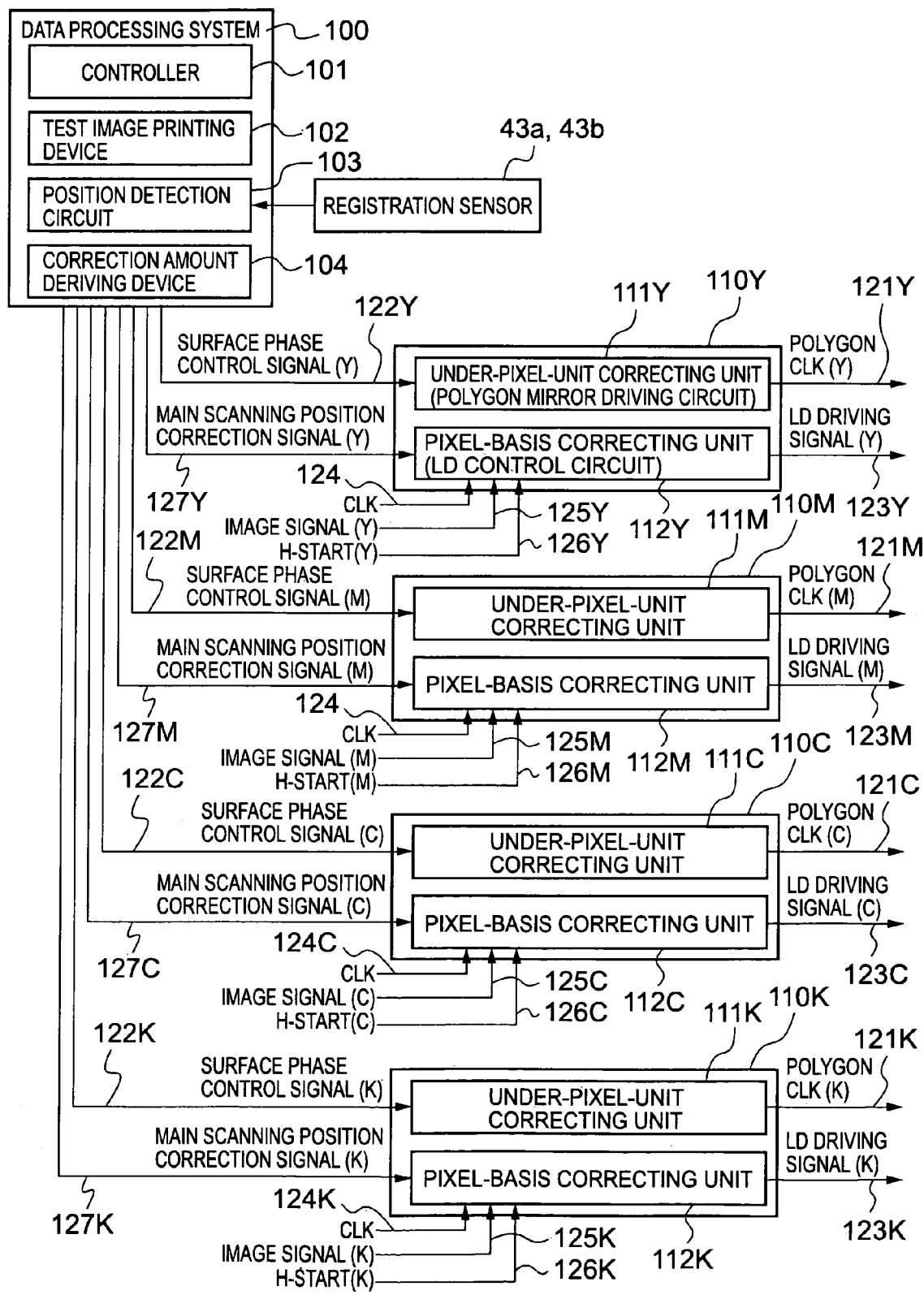
FIG. 1 is a block diagram showing the arrangement of a circuit portion associated with color misregistration correction in an image printing apparatus according to the present invention.

FIG. 1 shows the schematic arrangements of the data processing system 100 and correcting devices 110Y, 110M, 110C, and 110K in the image printing apparatus according to the present invention. FIG. 1 shows a circuit portion for correcting the positional offset of an image of each color in the main scanning direction. The data processing system 100 has a CPU as a main component, and includes a controller 101, test image printing device 102, position detection circuit 103, and correction amount deriving device 104. The controller 101 has a function of controlling a series of correcting operations to correct the positional offset between images of the respective colors. The test image printing device 102 prints registration marks on the intermediate transfer belt 41 by controlling the image printing units 50Y, 50M, 50C, and 50K and the like. The position detection circuit 103 reads the registration marks printed on the intermediate transfer belt 41 by using the registration sensors 43a and 43b, and derives positional offset correction amounts as correction amounts for the printing position of an image of each color which are required to eliminate the color misregistration between images of the respective colors. As positional offset correction amounts, a correction amount on a pixel basis and a correction amount less than the pixel unit are separately derived.

The Y correcting device 110Y is a circuit for correcting the printing position of a Y image printed on the intermediate transfer belt 41 by the image printing unit 50Y. The correcting device 110Y includes an under-pixel-unit correcting unit 111Y and pixel-basis correcting unit 112Y. The under-pixel-unit correcting unit 111Y is a circuit which generates a polygon CLK 121Y as a clock signal to be supplied to a motor for driving the polygon mirror 57Y of the laser unit 55Y. The under-pixel-unit correcting unit 111Y has a function of adjusting the phase of the polygon CLK 121Y on the basis of a surface phase control signal 122Y supplied from the data processing system 100.

The pixel-basis correcting unit 112Y is a circuit which generates an LD driving signal 123Y for ON/OFF-controlling the laser diode 56Y of the image printing unit 50Y. The pixel-basis correcting unit 112Y receives a CLK signal 124 serving as a reference for the timing of ON/OFF-controlling the laser diode 56Y on a pixel basis, an image signal 125Y as Y image data, and an H-START signal 126Y which indicates the timing at which a corresponding laser beam has crossed a reference position in the main scanning direction.

A main scanning position correction signal 127Y input from the data processing system 100 represents the timing of starting ON/OFF control on the LD driving signal 123Y in accordance with the image signal 125Y with reference to the H-START signal 126Y. For example, the main scanning position correction signal 127Y represents the number of clocks in the interval between the instant at which the H-START signal 126Y is input and the instant at which ON/OFF control on a laser beam is started. The pixel-basis correcting unit 112Y has a function of adjusting the position of a Y image in the main scanning direction which is printed on the intermediate transfer belt 41 in accordance with the value of the main scanning position correction signal 127Y input from the data processing system 100.

The M correcting device 110M is a circuit which corrects the printing position of an M image printed on the intermediate transfer belt 41 by the image printing unit 50M. The C correcting device 110C is a circuit which corrects the printing position of a C image printed on the intermediate transfer belt 41 by the image printing unit 50C. The K correcting device 110K is a circuit which corrects the printing position of a K image printed on the intermediate transfer belt 41 by the image printing unit 50K. Since each of these devices has the same arrangement as that of the Y correcting device 110Y, a description of the arrangement will be omitted.

The data processing system 100 is designed to separately control the positions of images of the respective colors in the main scanning direction by adjusting the values of the surface phase control signal 122Y and surface phase control signals 122M, 122C, and 122K and the values of the main scanning position correction signal 127Y and main scanning position correction signals 127M, 127C, and 127K which are supplied to the correcting devices 110Y, 110M, 110C, and 110K, respectively.

Figure 5:
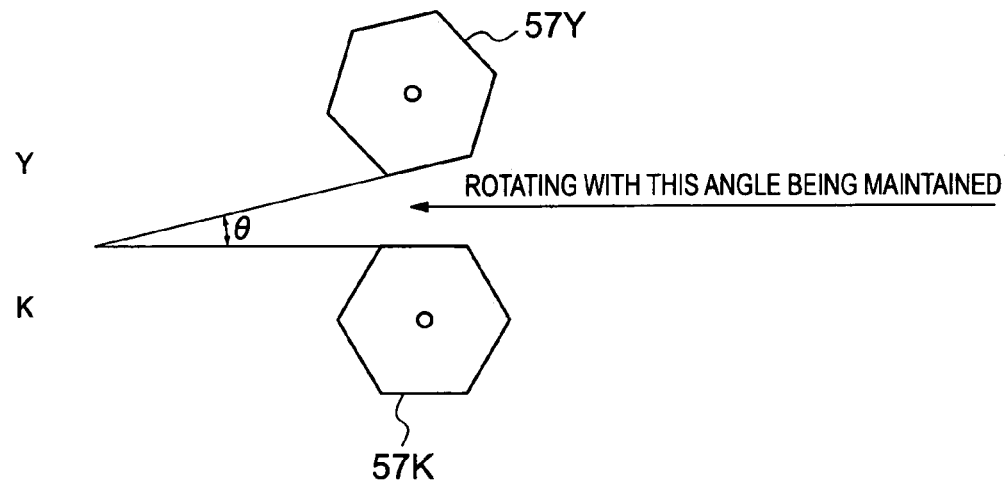
FIG. 5 is a view for explaining polygon mirrors in a state wherein surface phase control is performed on them.

FIG. 5 shows an example of a state wherein surface phase control is performed on polygon mirrors. The polygon mirror 57Y of the Y image printing unit 50Y rotates while keeping a phase difference of an angle with respect to a polygon mirror 57K of the K image printing unit 50K. By finely changing the angle, the image printing position in the main scanning direction is adjusted in amount less than the pixel unit.

Figure 6:
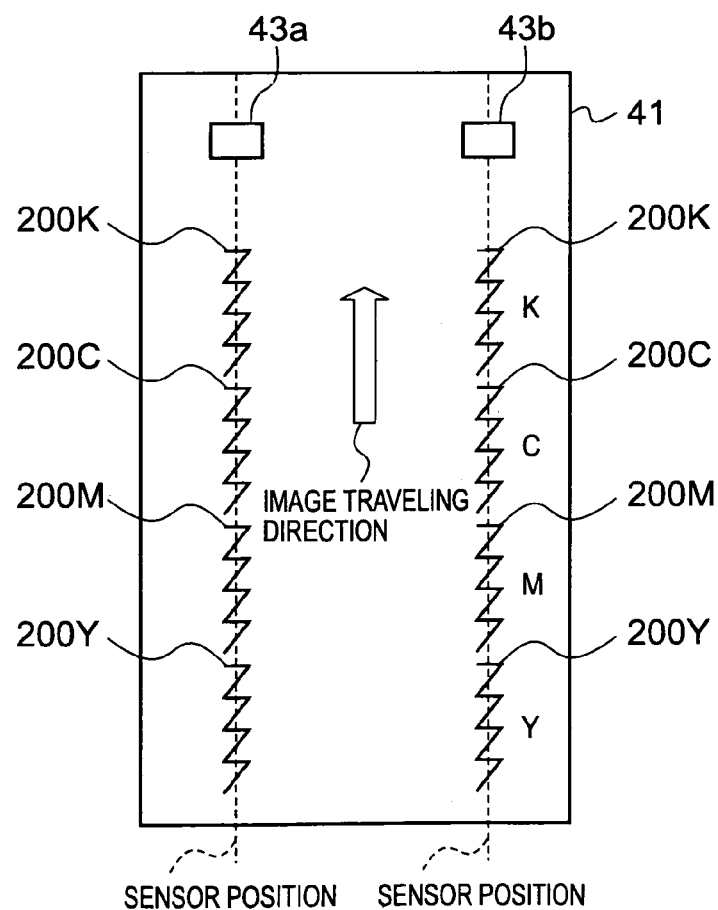
FIG. 6 is a view for explaining an example of registration marks printed on an intermediate transfer belt.

FIG. 6 shows an example of the registration mark printed on the intermediate transfer belt 41. The registration mark is constituted by a K registration mark 200K, C registration mark 200C, M registration mark 200M, and Y registration mark 200Y. Each of the registration marks 200Y, 200M, 200C, and 200k of the respective colors has a pattern in which a line element in the direction of width of the intermediate transfer belt 41 and an oblique line element alternately and repetitively (four times in FIG. 6) appear. The registration marks 200Y, 200M, 200C, and 200K are separately printed near the left and right ends of the intermediate transfer belt 41 in the direction of width, and are detected by the registration sensors 43a and 43b arranged at the respective corresponding positions.

Figure 7:
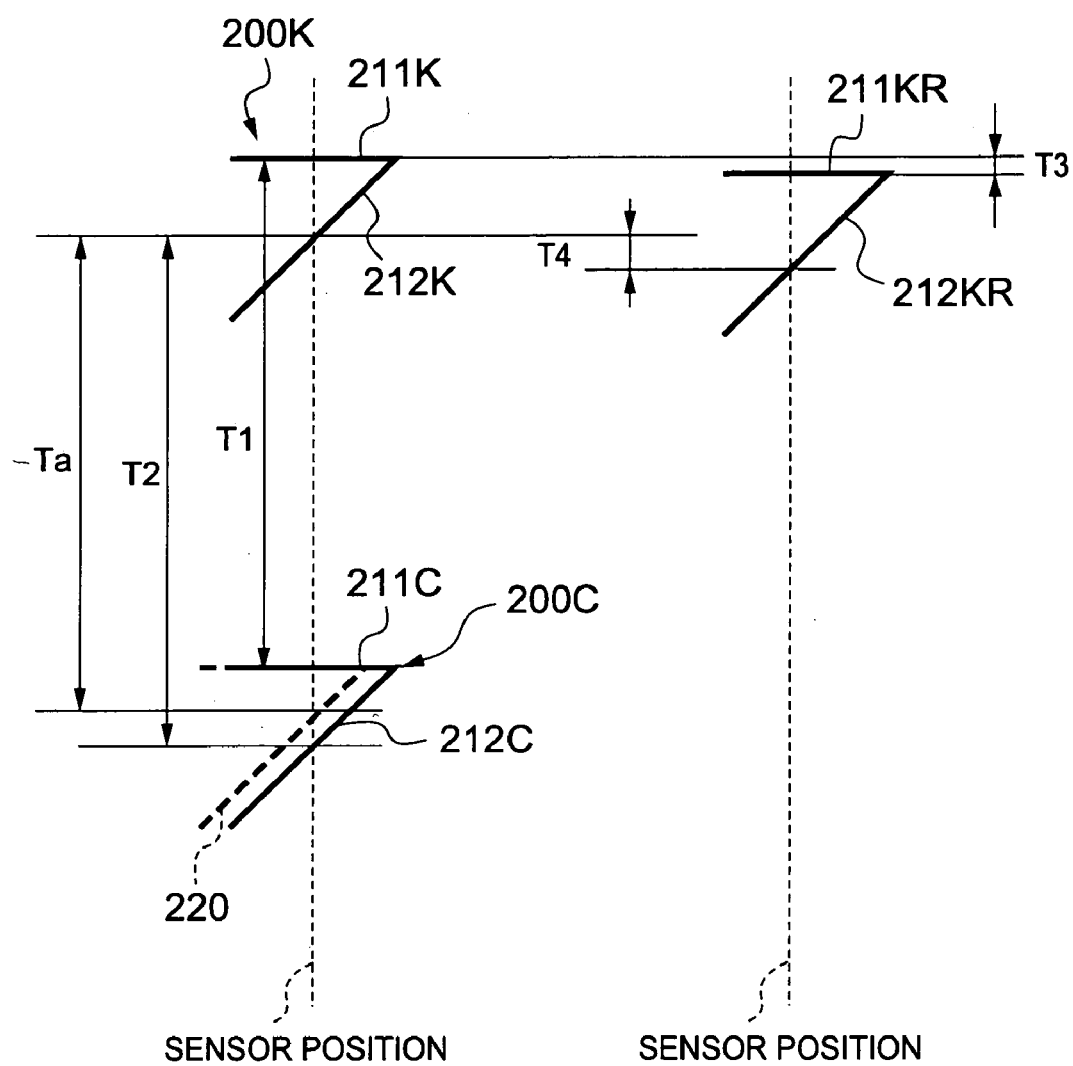
FIG. 7 is a view for explaining how the positional offset and lateral magnification of an image of each color are determined from registration marks.

FIG. 7 shows how the positional offset and lateral magnification of an image of each color are detected by registration marks. For example, the positional relationship between a K image and a C image in the sub-scanning direction is grasped on the basis of the length of a time T1 from the instant at which a first line element 211K of the K registration mark 200K in the direction of width is detected to the instant at which a first line element 211C of the C registration mark 200C in the direction of width is detected. The positional relationship between the K image and the C image in the main scanning direction can be grasped on the basis of the relationship between the previously detected time T1 and a time T2 from the instant at which a first oblique line element 212K of the K registration mark 200K is detected to the instant at which a first oblique line segment 212C of the C registration mark 200C is detected. If, for example, T1=T2, there is no positional offset in the main scanning direction. If T2 is shorter than T1 as indicated by Ta in FIG. 7, a C image 220 is offset from the K image to the left, as indicated by the broken line in FIG. 7. In addition, a positional offset amount can be grasped from the time difference between T1 and Ta.

The skew (inclination) of the K image is detected from the difference (T3) between the time when the left registration sensor 43a detects the first line element 211K of the K registration mark 200K on the left column in the direction of width and the time when a first line element 211KR on the right column in the direction of width is detected by the right registration sensor 43b. The lateral magnification of the K image is detected from the difference between the above difference (T3) and the difference (T4) between the time when the first oblique line element 212K of the K registration mark 200K on the left column is detected by the left registration sensor 43*a* and the time when a first oblique line element 212KR on the right column is detected by the right registration sensor 43*b*. With regard to the remaining colors, positional offsets, skews, and magnifications are detected in the same manner.

Figure 8:
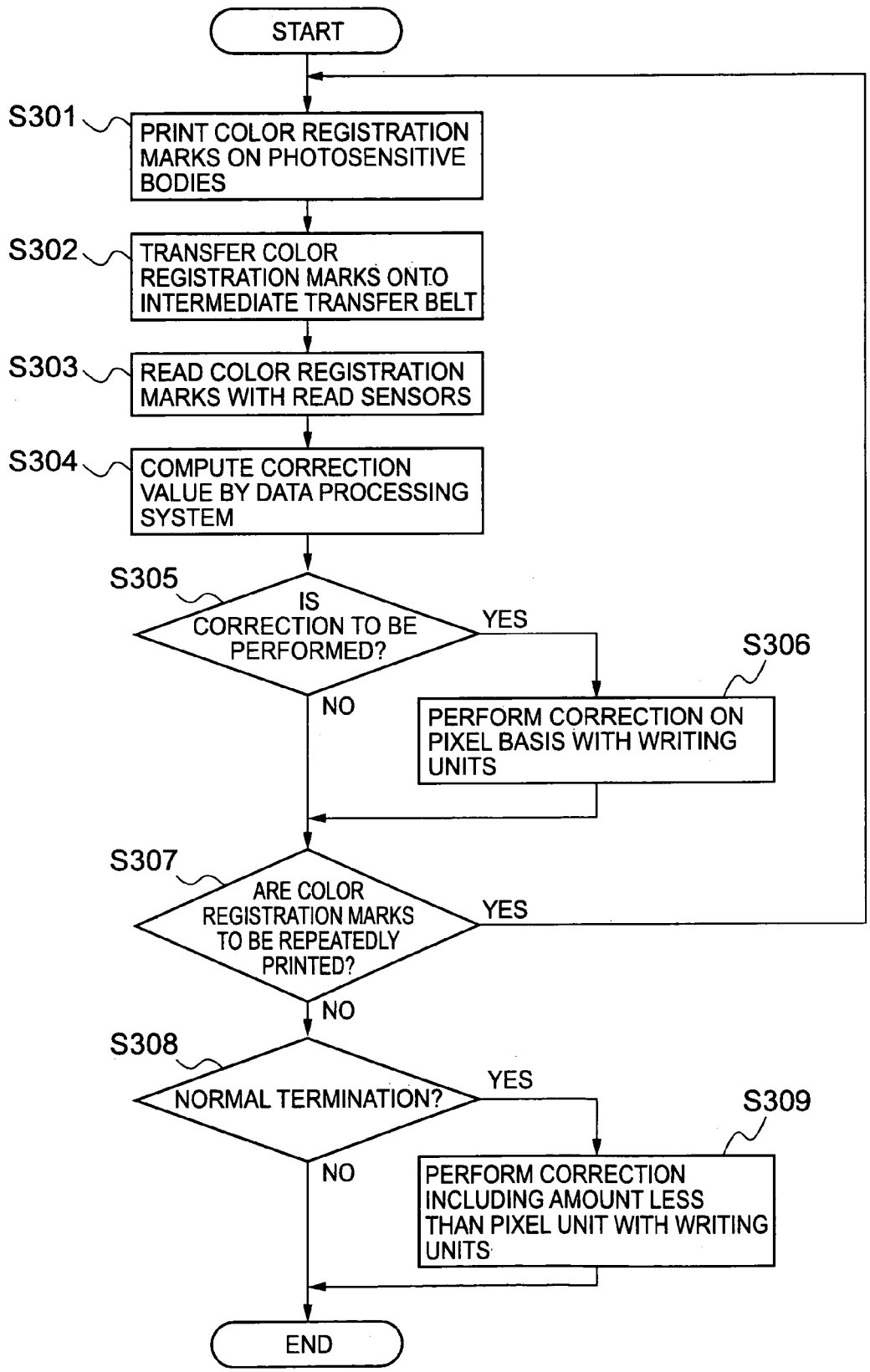
FIG. 8 is a flow chart showing a processing sequence for color misregistration correction performed in the image printing apparatus of the present invention.

FIG. 8 is a flow chart showing a processing sequence for color misregistration correction performed in the image printing apparatus according to the present invention. Correcting operation is performed in the first and second stages. The object of correcting operation is achieved by finally making a color misregistration amount fall within a target range. Therefore, there is no need to perform fine adjustment like adjustment with an amount less than the pixel unit in the process of convergence. It suffices to execute such fine adjustment only in the final finishing step. For this reason, in the first stage before the positional offset correction amount reaches a target range, the positional offset (color misregistration) of an image of each color is corrected on a pixel basis, and in the second stage after the correction amount falls within the target range, correction including a correction amount less than the pixel unit is executed.

In the first stage of correcting operation, the image printing units 50Y, 50M, 50C, and 50K are controlled to print registration marks of the respective colors on the photosensitive body 51Y and photosensitive bodies 51M, 51C, and 51K (step S301). These marks are transferred onto the intermediate transfer belt 41 to print the registration marks 200Y, 200M, 200C, and 200K on the belt (step S302). The registration marks 200Y, 200M, 200C, and 200K are read by the registration sensors 43*a* and 43*b* (step S303). The correction amount deriving device 104 of the data processing system 100 then derives a positional offset correction amount (step S304). It is then checked whether correction can be performed by the currently obtained correction amount. If, for example, registration marks have not been properly printed or a proper check cannot be made due to a flaw on the intermediate transfer belt 41, no correction is performed (step S305: N).

If there are no such factors and correction can be performed (step S305: Y), correction on a pixel basis is executed (step S306). In this case, with reference to the position of a K image, the printing positions of images of other colors are corrected on a pixel basis. The positional offset correction amount derived in step S304 includes a correction amount less than the pixel unit. In the correction in the first stage, however, only a portion on a pixel basis is corrected. If, for example, the derived positional offset correction amount is 4.68 dots, correction for the pixel-basis portion (integral portion), i.e., 4 dots, is executed. Correction on a pixel basis is performed by changing the values of the main scanning position correction signals 127Y, 127M, 127C, and 127K to be supplied to the pixel-basis correcting unit 112Y and pixel-basis correcting units 112M, 112C, and 112K. This correction is quickly finished only by setting values for the pixel-basis correcting units 112Y, 112M, 112C, and 112K.

It is then checked whether or not printing and measurement of registration marks are repeated (step S307). If an error occurs as a result of repeating determination of "no correction (N)" in step S305, or the positional offset correction amount falls within the target range, the correction in the first stage is terminated without repeating printing of registration marks, and the flow advances to the second stage (step S307: NO). If no error occurs and the positional offset correction amount has not fallen in the target range (step S307: Y), the flow returns to step S301 to execute printing/ measurement of registration marks again. That is, if the positional offset correction amount has not fallen in the target range, the next registration mark is printed upon execution of correction on a pixel basis.

In correction in the second stage, it is checked whether or not the correcting operation in the first stage is normally complete without any error (step S308). If an error has occurred (step S308: N), the correcting operation is terminated due to the error. If the correction in the first stage is normally complete (step S308: Y), corrections including correction with an amount less than the pixel unit are executed (step S309), and a series of correcting operations are terminated (END). Assume that the target range corresponds to two pixels, and the positional offset correction amount finally obtained by printing/measuring a registration mark is 1.6 dots. In this case, correction is performed for the pixel-basis portion, i.e., 1 dot, in step S306. Correction is executed for the remaining 0.6-dot portion in step S309.

The correction with an amount less than the pixel unit is performed by changing the values of the surface phase control signals 122Y, 122M, 122C, and 122K which are supplied from the data processing system 100 to the under-pixel-unit correcting unit 111Y and under-pixel-unit correcting units 111M, 111C, and 111K. This correction is performed by surface phase control on polygon mirrors. It therefore takes several seconds until the rotation of each polygon mirror stabilizes between the instant at which the angles of the polygon mirrors are changed by changing the values of the surface phase control signals 122Y, 122M, 122C, and 122K and the instant at which the correcting operation is complete. If it is necessary to print the next test image, only correction on a pixel basis which can be finished within a short period of time is executed before printing, but correcting operation with an amount less than the pixel unit, which requires a long period of time, is not executed. Therefore, printing of the next test image can be started immediately after the correction. That is, the time required for one cycle of printing a test image, measuring it to derive a positional offset correction amount, and performing correction on the basis of the correction amount can be shortened. When, therefore, this cycle is to be repeated to make a positional offset correction amount fall within a target range, the time required to complete a series of correcting operations can be shortened.

Although the embodiment of the present invention has been described in association with the accompanying drawings, practical arrangements are not limited to this embodiment. The present invention incorporates various changes and additions within the spirit and scope of the invention. For example, in the above embodiment, when a positional offset correction amount falls within a target range, correction on a pixel basis is performed in step S306, and correction with a correction amount less than the pixel unit is performed in step S309. However, correction on a pixel basis and correction with a correction amount less than the pixel unit may be simultaneously executed in accordance with the positional offset correction amount.

The above embodiment has exemplified the case wherein the positional offset of an image of each color is corrected in the main scanning direction. However, the present invention can also be applied to correction in the sub-scanning direction. That is, if correcting operation can be executed by separately performing the first correcting operation and the second correcting operation which requires more time than the first correcting operation and aims for finer correction, only the first correcting operation, which can be finished within a short period of time, may be executed before the next test images printed.

What is claimed is:

1. An image printing apparatus which includes a plurality of image printing means for printing images of different colors and prints a color image by superimposing, on a single image printing medium, a plurality of images of the respective colors printed by the plurality of image printing means, comprising:

test image-printing means for printing, on the image printing medium, test images for correcting a positional offset between images of the respective colors;

correction amount deriving means for deriving a positional offset correction amount for the images of the respective colors by measuring the test images printed on the image printing medium;

correction means for correcting a printing position of an image printed by said each image printing means; and control means for controlling a series of correcting operations for correcting a positional offset between the images of the respective colors, wherein said control means executes the correcting operation in a first stage and a second stage, corrects a positional offset on a pixel basis in the first stage until the positional offset correction amount reaches a predetermined target range, and corrects a positional offset including a correction amount less than a pixel unit in the second stage.

2. An apparatus according to claim 1, wherein said control means derives a correction amount by executing printing and measurement of the test images in the first stage, and performs correction in the second stage on the basis of a correction amount left unprocessed in the first stage.

3. An apparatus according to claim 1, wherein a time required for correction on a pixel basis is shorter than a time required for correction with an amount less than a pixel unit.

4. An apparatus according to claim 1, wherein correction with an amount less than the pixel unit is performed by surface phase control on polygon mirrors.

5. An image printing apparatus which includes a plurality of image printing means for printing images of different colors and prints a color image by superimposing, on a single image printing medium, a plurality of images of the respective colors printed by the plurality of image printing means, comprising:

test image printing means for printing, on the image printing medium, test images for correcting a positional offset between images of the respective colors;

correction amount deriving means for deriving a positional offset correction amount for the images of the respective colors by measuring the test images printed on the image printing medium;

correction means for correcting a printing position of an image printed by said each image printing means; and control means for controlling a series of correcting operations for correcting a positional offset between the images of the respective colors, wherein after deriving a positional offset correction amount by printing and measuring test images, said control means repeatedly executes correction of a printing position of an image on the basis of the positional offset correction amount, corrects a positional offset of an image on a pixel basis while the derived positional offset correction amount has not reached a predetermined target range, and corrects a printing position of an image including a correction amount less than a pixel unit when the positional offset correction amount has reached the target range.

6. An apparatus according to claim 5, wherein while the positional offset correction amount has not reached the target range, said control means corrects the positional offset of the image on a pixel basis by repeatedly printing the test images, measuring the test images, deriving the positional offset correction amount, and correcting a printing position of an image.

7. An apparatus according to claim 5, wherein said control means finishes a series of correcting operations by executing correction including a correction amount less than the pixel unit.

8. An apparatus according to claim 5, wherein a time required for correction on a pixel basis is shorter than a time required for correction with an amount less than a pixel unit.

9. An apparatus according to claim 5, wherein correction with an amount less than the pixel unit is performed by surface phase control on polygon mirrors.

10. A color misregistration correction method in an image printing apparatus which includes a plurality of image printing means for printing images of different colors and prints a color image by superimposing, on a single image printing medium, a plurality of images of the respective colors printed by the plurality of image printing means, comprising:

executing color misregistration correction in a first stage and a second stage after the first stage;

correcting a positional offset on a pixel basis in the first stage until a positional offset correction amount for images of the respective colors reaches a predetermined target range; and correcting a positional offset including a positional offset correction amount less than a pixel unit in the second stage.

11. A color misregistration correction method in an image printing apparatus which includes a plurality of image printing means for printing images of different colors and prints a color image by superimposing, on a single image printing medium, a plurality of images of the respective colors printed by the plurality of image printing means, comprising the steps of:

(a) printing, on the image printing medium, test images for correcting a positional offset between images of the respective colors;

(b) deriving a positional offset correction amount for the images of the respective colors by measuring the test images;

(c) correcting a positional offset between the images of the respective colors on the basis of the positional offset correction amount;

(d) repeating the steps (a) to (c) until the positional offset correction amount reaches a predetermined target range; and correcting the positional offset between the images of the respective colors including a positional offset with an amount less than a pixel unit when the positional offset correction amount reaches the target range.

12. A method according to claim 11, wherein a time required for correction on a pixel basis is shorter than a time required for correction with an amount less than a pixel unit.

13. A method according to claim 11, wherein correction with an amount less than the pixel unit is performed by surface phase control on polygon mirrors.

* * * * *